(12) United States Patent
Purdy

(10) Patent No.: US 7,240,090 B2
(45) Date of Patent: Jul. 3, 2007

(54) DATA QUEUEING

(75) Inventor: Paulene M. Purdy, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 911 days.

(21) Appl. No.: 10/287,277

(22) Filed: Nov. 4, 2002

(65) Prior Publication Data

US 2004/0088427 A1 May 6, 2004

(51) Int. Cl.
*G06F 15/13* (2006.01)
(52) U.S. Cl. .................. 709/203; 370/412; 370/433
(58) Field of Classification Search ............... 709/203; 370/412, 433
See application file for complete search history.

(56) References Cited

U.S. PATENT DOCUMENTS

| | | | | |
|---|---|---|---|---|
| 5,469,560 | A * | 11/1995 | Beglin ................... | 711/112 |
| 5,915,092 | A * | 6/1999 | Morita et al. ........... | 709/213 |
| 6,487,210 | B1 * | 11/2002 | Janoska et al. ......... | 370/412 |
| 6,650,652 | B1 * | 11/2003 | Valencia ................. | 370/433 |
| 6,675,195 | B1 * | 1/2004 | Chatterjee et al. ...... | 709/203 |
| 2001/0024446 | A1 * | 9/2001 | Craig et al. ............ | 370/412 |

* cited by examiner

*Primary Examiner*—Jinsong Hu

(57) ABSTRACT

A system and method for controlling queues by reducing the amount of redundant operations requested by commands associated with elements in the queue is provided. Control of queueing is provided by combining elements in the queue requesting redundant operations and eliminating those elements from the queue. Priority levels for each of the elements are also combined.

13 Claims, 3 Drawing Sheets

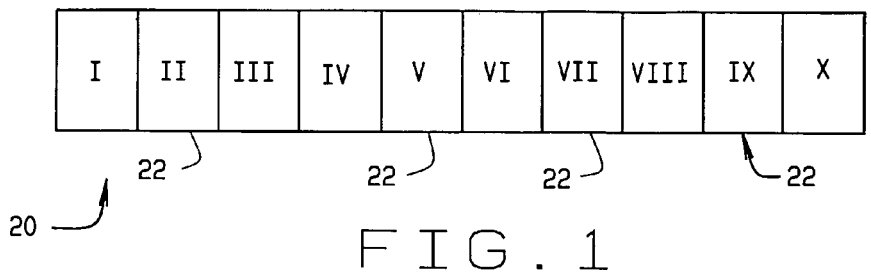
FIG. 1
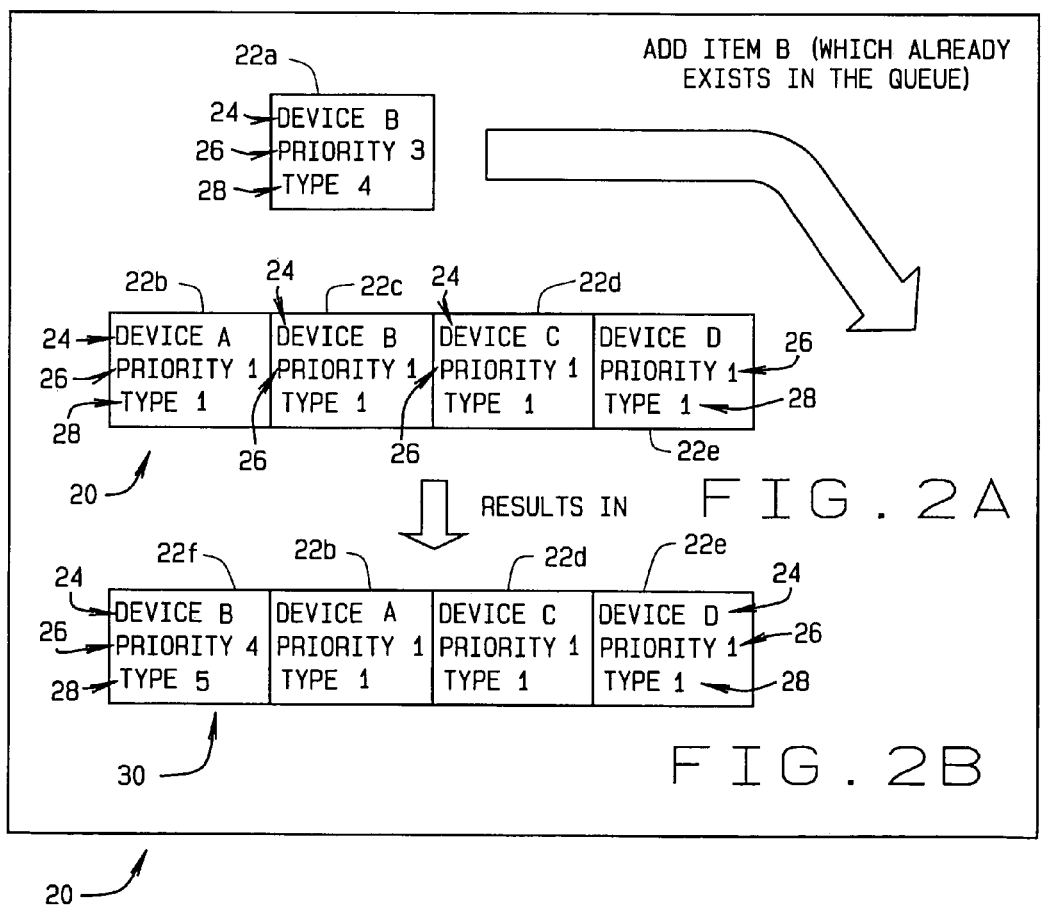
FIG. 2A
FIG. 2B

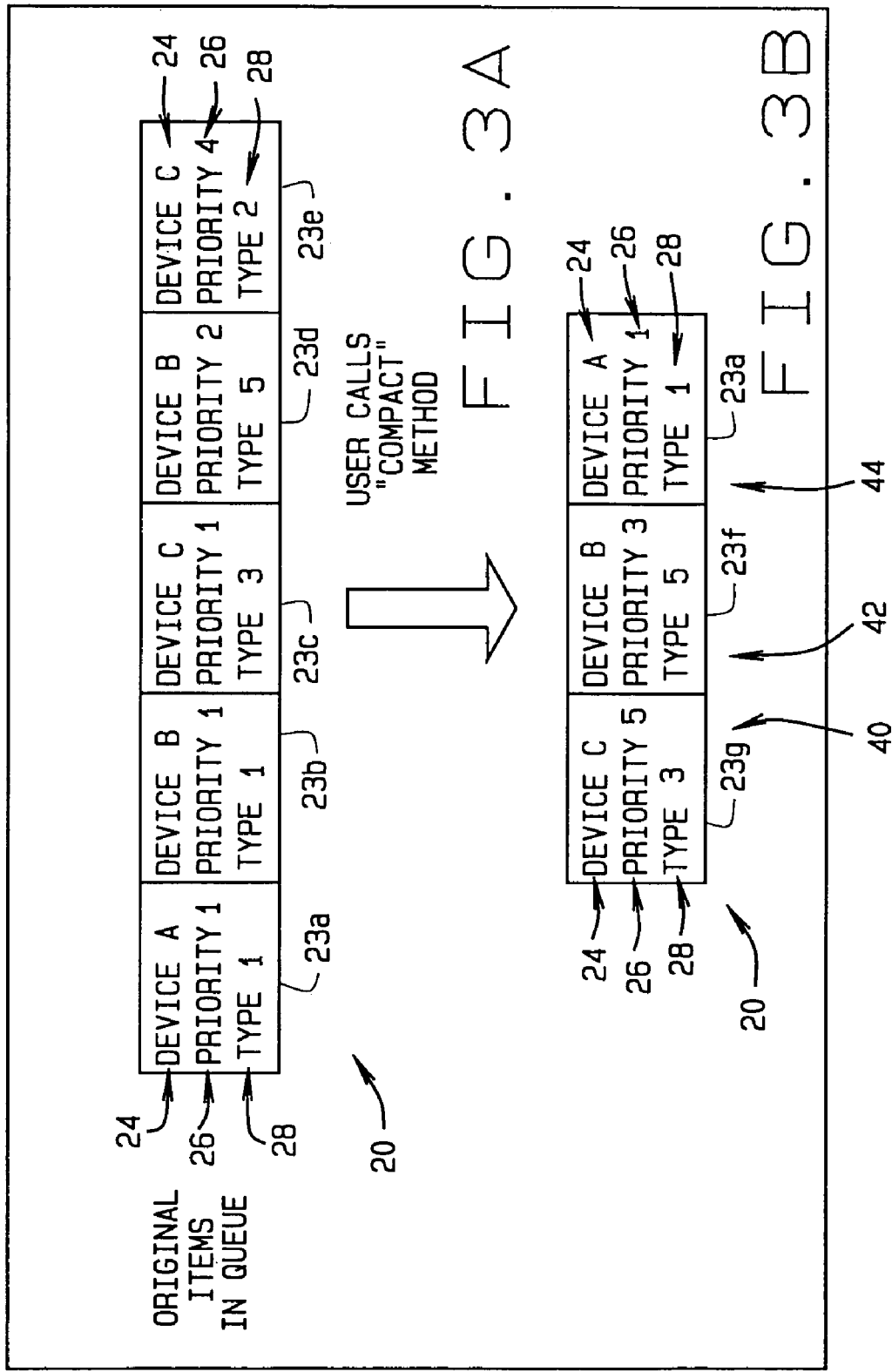

DATA QUEUEING

BACKGROUND OF THE INVENTION

In a network resources are constantly accessed to perform functions or operations based upon specified commands. Different applications or devices within the network may request access to the same system resources to perform the functions or operations. Further, these different applications or devices may request that the system resources perform the same or different functions and/or operations.

A queue is often provided to control requests from different applications or devices within a network to access the system resources. A queue typically contains elements, each having commands or tasks associated therewith for requesting access to the system resources to perform specific functions or operations. The elements may be arranged, for example, based upon time (e.g., first in, first out) or may be arranged based upon priority (e.g., highest priority first). Further, queues may be used to control access to many different types of system resources. For example, a printer queue may be provided for controlling print requests to one or more printers (e.g., controlling the order in which the print commands in the printer queue are executed). As another example, a queue may be provided that controls access to a network device (e.g., storage device) for obtaining status or event information relating to that network device.

Therefore, improving control of the queues may provide improvement in overall network performance (e.g., more efficient access to network resources may reduce access times to the resources). Further, improved control of queues may reduce the amount of network operations needed to execute the commands in the queue (e.g., use less processing power to execute the commands).

SUMMARY OF THE INVENTION

Embodiments of the present invention provide a system and method for controlling queues by reducing the amount of redundant operations requested by commands associated with elements in the queue. These embodiments allow for improved queueing by combining elements in the queue that are requesting redundant operations and eliminating those elements from the queue.

Specifically, in one embodiment a method includes comparing a plurality of elements in a data queue to determine elements relating to a same system resource and combining elements in the data queue relating to the same system resource. Further, each of the elements may include a priority level with the method providing for determining a combined priority level for the combined elements based upon the priority levels for each of the elements combined. The method also may include arranging the plurality of elements based upon the priority levels or rearranging the combined elements based upon the determined combined priority level.

In another embodiment of the present invention a computer implemented includes identifying elements in a data queue having commands for execution in connection with a system resource for which another element includes commands for execution in connection with the same system resource. The method further includes eliminating the elements in the data queue having commands for the same system resource as the another element, and wherein each element includes a priority level associated therewith. The method also includes combining the priority levels of the eliminated elements with the priority level of the another element. The combining may include summing the priority levels. The method may include arranging the elements based upon priority levels.

In yet another embodiment of the present invention a system providing queueing to reduce redundant operations includes a controller for determining elements in a queue relating to a same system resource and eliminating elements having redundant operations to be performed in connection with the same system resource to provide a single element relating the system resource. The system also includes a user interface for providing user input to the controller. Each of the elements may include a priority level with the controller configured to combine the priority levels of eliminated elements in the single element.

Further areas of applicability of embodiments of the present invention will become apparent from the detailed description provided hereinafter. It should be understood that the detailed description and specific examples, while indicating the preferred embodiments of the invention, are intended for purposes of illustration only and are not intended to limit the scope of the embodiments of the invention.

BRIEF DESCRIPTION OF THE DRAWINGS

Embodiments of the present invention will become more fully understood from the detailed description and the accompanying drawings, wherein:

FIG. 1 is a simplified block diagram of an exemplary queue in connection with which embodiments of the present invention may be implemented;

FIGS. 2(*a*) and 2(*b*) are block diagrams of an embodiment of the present invention to control a queue when a new element is added to the queue;

FIGS. 3(*a*) and 3(*b*) are block diagrams of an embodiment of the present invention to control a queue having elements with duplicate commands associated therewith.

DETAILED DESCRIPTION OF PREFERRED EMBODIMENTS

Figure 4:
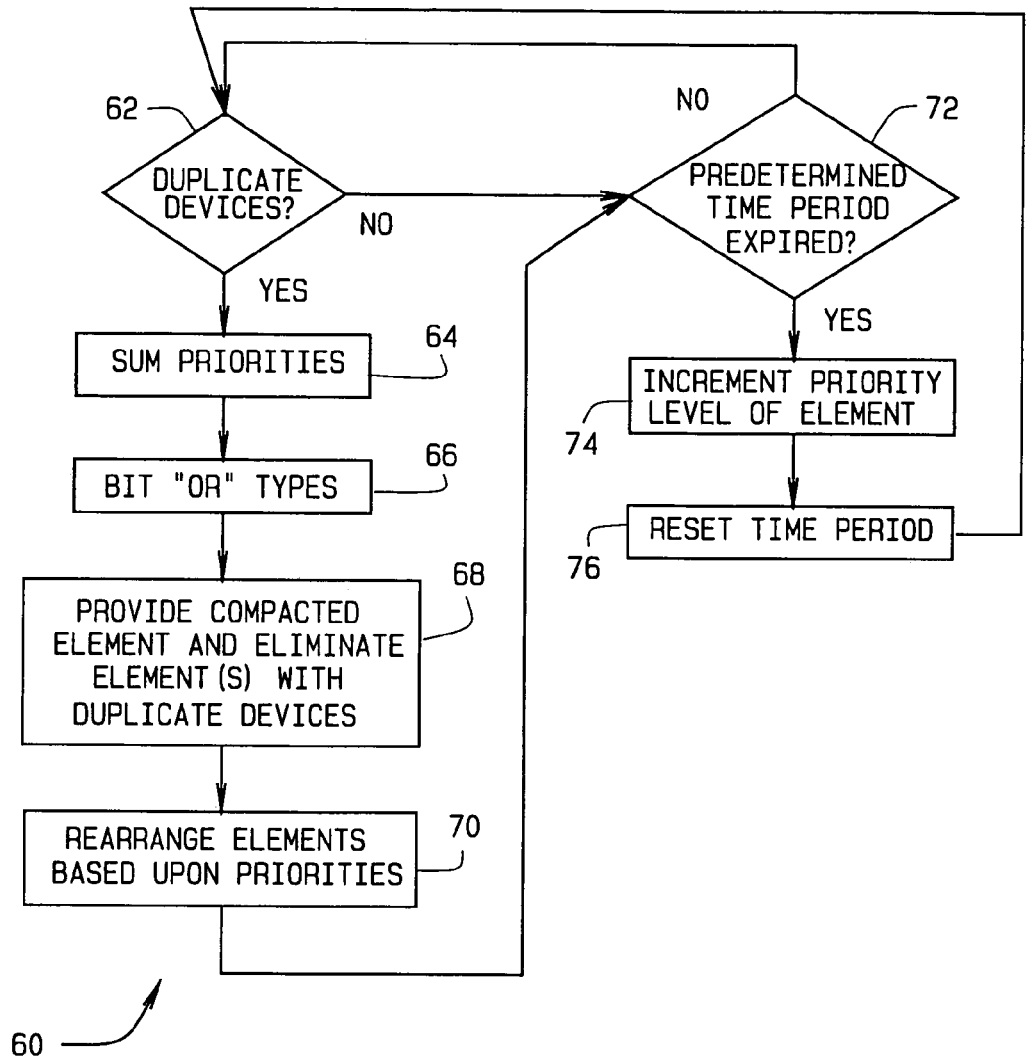
FIG. 4 is a flow chart showing a compacting process of an embodiment the present invention to control a queue.

The following description of the preferred embodiments is merely exemplary in nature and is in no way intended to limit the embodiments of the invention, their application, or uses. Although embodiments of the present invention are described in connection with controlling queues based upon particular factors, they are not so limited, and embodiments of the present invention may be implemented using different factors.

Embodiments of the present invention provide a system and method for controlling queues to eliminate elements within the queue requesting access to the same system resources (e.g., network device) by combining those elements. Embodiments of the present invention combine priority levels and provide the combined priority levels with the combined elements, which elements may be rearranged in the queue based upon the combined priority levels.

A queue 20 in connection with which embodiments of the present invention may provide control is shown generally in FIG. 1 and includes a plurality of elements 22 providing a sequence for execution or performance of commands associated with the elements 22. For example, the elements 22 of the queue 20 may be arranged based upon time (e.g., first in, first out). In such a case, the commands associated with the element 22 identified as "I" are first executed, followed by the commands associated with the element identified as "II," and so on. As another example, the elements 22 of the queue 20 may be arranged based upon priority (e.g., highest priority first). In such a case, the highest priority commands will be provided with the element 22 identified as "I" and will be executed first. Thereafter, the next highest priority commands will be provided with the element 22 identified as "II" and will be executed next, and so on. The elements 22 of the queue 20 further may be arranged based upon reverse time (e.g., first in, last out) or arranged based upon some other desired factor. Essentially, an element 22 defines a position in the queue 20 for execution of commands associated with that element 22. It should be noted that the elements 22 may have commands associated therewith for execution in connection with the same system resources (e.g., same network devices) and/or have the same commands for execution.

Having described exemplary queues 20 in connection with which embodiments of the present invention may be implemented, embodiments of the present invention provide a system and method for controlling queues 22 to reduce redundant operation (e.g., redundant execution of commands associated with different elements 22 in the queue 20). In general, and in one embodiment of the present invention as shown in FIGS. 2 and 3, a method for controlling queues compares a plurality of elements 22 in a data queue 20 to determine elements 22 relating to the same system resource (e.g., same network device), with each of the elements 22 having a priority level. The elements 22 in the data queue 20 relating to the same system resource are combined. Thereafter, a combined priority level for the combined elements based upon the priority levels for each of the elements 22 combined is determined. The elements 22 in the queue 20 then may be rearranged based upon the combined priority level. The combined priority level may be determined, for example, by summing all of the priority levels of the elements 22 combined. Essentially, embodiments of the present invention provide for combining elements 22, and thus eliminating elements 22 having commands associated therewith for execution in connection with the same system resource or that are duplicative.

Specifically, and as shown in FIGS. 2(a) and 2(b) for example, a queue 20 may include a plurality of elements 22, with each element 22 identified in connection with a different system resource, such as a network device, indicated by a network device indication 24 (e.g., Device A, Device B, Device C and Device D). Further, each element 22 includes a priority level indication 26 (e.g., Priority 1, Priority 3 or Priority 4) associated therewith to identify the priority of the command(s) provided in connection with that element 22. For example, the priority level value is higher for commands having higher priority. In one embodiment, the priority level is limited to a predetermined range of values (e.g., between 1 and 10). Each element 22 also includes a type indication 28, which identifies the command(s) associated therewith for execution. In one embodiment, the type indication is represented by binary bits (e.g., four bit binary number). For example, Type 4 is represented by the binary number "0100".

As shown in FIGS. 2(a) and 2(b), an embodiment of the present invention may provide for compacting a queue 20 when a new element 22a is be added to the queue 20, which in this embodiment includes four other elements 22b-22e. Specifically, as shown in FIG. 2(a), the new element 22a is associated with the same system resource as element 22c (i.e., Device B). Thus, the new element 22a and element 22c include commands to be performed in connection with the same system resource. Thus, as shown in FIG. 2(b), the new element 22a and element 22c are combined to form element 22f. As shown therein, the priority level indications 26 are summed, resulting in a combined priority level indication 26 of "4" (i.e., 1+3). Further, the type indications 28 are combined, which is this embodiment is provided using a logical bit OR function, resulting in a type indication of "Type 5" (i.e., 0100 OR 0001).

It should be noted that based upon the resultant combined priority level indication 26 of "4," element 22f is now the highest priority element and is moved to the first position 30 in the queue 20, with the commands associated therewith executed before the commands of any other elements 22. Further, it should be noted that the process described (i.e., queue compacting process) may be initiated upon the addition of a new element 20 or upon user activation (e.g., user initiation of a compact command).

Referring now to FIGS. 3(a) and 3(b), an embodiment of the present invention may provide for compacting a queue 20 when elements 23 relating to the same system resource, which in this embodiment is a network device, are present in the queue 20. Specifically, and as shown in FIG. 3(a), element 23b is associated with the same system resource as element 23d (i.e., Device B) and element 23c is associated with the same system resource as element 23e (i.e., Device B). Thus, these elements include commands to be performed in connection with the same system resources.

As shown in FIG. 3(b), element 23b and element 23d are combined to form compacted element 23f, and element 23c and 23e are combined to form compacted element 23g. As shown therein, the priority level indications 26 are summed, resulting in a combined priority level indication 26 of "3" (i.e., 1+2) for the combination of elements 23b and 23d, and a combined priority level indication 26 of "5" (i.e., 3+2) for the combination of elements 23c and 23e. Further, the type indications 28 are combined, which is this embodiment is provided using a logical bit OR function, resulting in a type indication 28 of "Type 5" (i.e., 0001 OR 0101) for the combination of elements 23b and 23d and a type indication 28 of "Type 3" (i.e., 0011 OR 0010) for the combination of elements 23c and 23e. Thus, the combination of elements 23b and 23d results in the compacted element 23f and the combination of elements 23c and 23e results in the compacted element 23g. Each of the compacted elements 23f and 23g have priority level indications 26 and type indications 28 that are based upon the elements from which they were combined.

It should be noted that based upon the resultant combined priority level indications 26, compacted element 22g is now the highest priority element (i.e., Priority 5) and is moved to the first position 40 in the queue 20, with the commands associated with this compacted element 22g executed before any other elements. Compacted element 22f is now the second highest priority element (i.e., Priority 3) and is in the second position 42 in the queue 20, and element 20a is now the third highest priority element (i.e., Priority 1) and is in the third position 44 in the queue 20.

It should be noted that the compacting process may include increasing the priority level of particular elements 22 based upon a user defined time period. For example, for a particular element 22 in the queue 20, a user may specify a time period (e.g., five seconds), after the expiration of which the priority level is incremented (e.g., increment priority level by one). Thus, a predetermined time period may be associated with specific elements 22 in the queue 20 that is used to increase the priority level of those element(s) 22 after the expiration of the predetermined time period.

A compacting process 60 of one embodiment of the present invention is shown in FIG. 4. A determination is made at 62 as to whether elements 22 are associated with the same system resource, for example the same network devices (i.e., duplicate devices) as indicated by the network device indication 24. If elements 22 associated with duplicate devices exist, then the priorities of those elements 22, as indicated by the priority indication 26 are summed at 64. The types, as indicated by the type indication 28, are logically "ORed" as described herein at 66. Compacted elements 22 are thereby provided and elements 22 associated with duplicate devices are eliminated (e.g., removed or deleted from the queue 20) at 68. The elements 22, including the compacted elements 22 are thereafter rearranged within the queue 20 at 70 based upon priority levels, including combined priority levels of the compacted elements 22.

Thereafter, or if elements 22 associated with the same system resource do not exist as determined at 62, then at 72 a determination is made as to whether a predetermined time period, which may be set by a user, has expired for any of the element(s) 22. This predetermined time period may be associated with specific element(s) 22 as described herein. However, it should be noted that none of the element(s) 22 in the queue 22 may have a predetermined time period associated therewith. If this is the case, then at 72 a determination is made that no time periods have expired because none exist.

If a predetermined time period exists for one or more element(s) 22 and has not expired as determined at 72, then a determination is again made at 62 as to whether elements 22 are associated with the same system resource. If a predetermined time period exists for one or more element(s) 22 and has expired, then the element(s) 22 having a predetermined time period (e.g., five seconds) associated therewith have their priority level incremented (e.g., increment priority level by one) at 74. The predetermined time period is then reset for those element(s) 22 at 76 (e.g., timer associated with the element(s) 22 reset to five seconds). Thereafter, the process 60 again makes a determination whether elements 22 (e.g., newly added elements 22)) are associated with the same system resource at 62. It should be noted that the time period may be provided by any appropriate device or process, for example, using a network timer.

Thus, the compacting process 60 may be provided for controlling queues in different systems operating with different types of devices. For example, in a storage area network (SAN), requests for different types of information from a device (e.g., network storage device) may be made by different parts of a management application (e.g., Storage Area Manager). The parts of the application may include, for example, the GUI, an Event Status Poller (ESP) component and a Device Discovery and Topology (DDT) component. The GUI will typically need a higher priority than the other two components in order to be more responsive to a user's request. The compacting process 60 attempts to prevent the system from performing the same task more often that needed (e.g., duplicate commands executed in connection with same device), while giving some requests a higher priority. Using the compacting process 60 as described herein, if the same task (e.g., commands) is requested from multiple sources (e.g. the GUI & DDT), the task is performed only once using compacted queueing as described herein.

A task may include, for example, calling (i.e., communicating with) an interface or several interfaces on a device plug-in (DPI) that return information about a particular device on the SAN. Examples of interfaces include:

(1) Device—retrieves information such as the device's name, vendor, product id, product revision, firmware revision, node WorldWide Name (WWN), and serial number;
(2) Status—including Major, Minor, Warning, Good, Unreachable;
(3) Events—for example a fan stops operating;
(4) Ports—including name, type, subtype, etc. for each port on the device
(5) AttachedDevices—including port where connection occurs; port WWN, address, and node WWN of device that is attached to the current device;
(6) IpInfo—including secondary IP addresses that pertain to a device;
(7) InternalDrives—including disks within a device;
(8) StorageUnits—including logical units within a device; and
(9) LunIdentification—given a SCSI path on a host, identifies the LUN to which it points.

Thus, and for example, the ESP may request that the Status, Events, Ports, and AttachedDevices interfaces are called on a particular device. At the same time, the GUI may request those interfaces as well as the Device, IpInfo, InternalDrives, and StorageUnits interfaces are called on the same device. Because both requests are for the same device, the compacting process 60 calls all the interfaces requested on the same device once. Thus, each request is satisfied with the same interface only called once.

In operation, the ESP may make a normal request for interfaces ("ESP_IFS") on several devices, the DDT may make a normal request for interfaces (call it "DDT_IFS") on several devices and the GUI may make a normal request for interfaces (call it "GUI_IFS"). Using the compacting process 60, requests for the same devices to be processed are "compacted" into one element 22 (e.g., combining elements 22 having commands or requests relating to the same network resource) and the combination of the interfaces is called on that device. Further, and as described herein, the priority level of the command(s) or task(s) in the queue 20 is the sum of each individual request's priority. Thus, in this example, if the priority of the DDT request is 1, the ESP request is 1, and the GUI request is 10, the priority of the resulting task(s) or command(s) on the queue 20 is 12. The request with the highest priority in the queue 20 is positioned (e.g., moved) to the front of the queue 20 to be processed next.

The description of embodiments of the invention is merely exemplary in nature and, thus, variations that do not depart from the gist of the embodiments of the invention are intended to be within the scope of the embodiments of the invention. Such variations are not to be regarded as a departure from the spirit and scope of the embodiments of the invention.

What is claimed is:

1. A method comprising:
    comparing a plurality of elements in a data queue to determine elements relating to a same system resource;
    combining two elements in the data queue to form a single element if the two elements relate to the same system resource;
    placing the single element in a location in the data queue based on priority levels of both the two elements; and
    adding the priority levels of the two elements to determine a priority level for the single element.

2. The method according to claim 1 further comprising, executing the single element before other elements in the data queue due to a combination of the priority levels of the two elements.

3. The method according to claim 1 further comprising, re-arranging the plurality of elements based upon the priority levels.

4. The method according to claim 1 further comprising, replacing the two elements with the single element in order to reduce an overall number of elements in the data queue.

5. The method according to claim 1 further comprising:
receiving from a user a time period for a command in the data queue;
after expiration of the time period, incrementing a priority of the command.

6. The method according to claim 1 further comprising incrementing a priority level of the single element after expiration of a predetermined time period.

7. The method according to claim 1 wherein the two elements are duplicate commands that are combined to compact the data queue.

8. A method comprising:
comparing a plurality of elements in a data queue to determine elements relating to a same system resource;
combining two elements in the data queue to form a single element if the two elements relate to the same system resource;
placing the single element in a location in the data queue based on priority levels of both the two elements; and
giving the single element a higher priority in the data queue than a priority of either of the two elements.

9. A method comprising:
comparing a plurality of commands in a data queue to determine whether two separate commands are directed to being performed at a same storage device;
combining the two separate commands into a single command in the data queue in order to reduce an overall number of commands in the data queue;
placing the single command at a location in the data queue based on a combination of priority levels for each of the two separate commands; and
adding priority levels of the two separate commands to determine a priority level for the single command.

10. The method of claim 9 further comprising, increasing a priority of the single command so the single command is executed before other commands in the data queue.

11. The method of claim 9 further comprising:
removing the two separate commands from the data queue;
replacing the two separate commands with the single command to compact the data queue.

12. The method of claim 9 further comprising, re-arranging commands in the data queue based upon the combination.

13. A method comprising:
comparing a plurality of commands in a data queue to determine whether two separate commands are directed to being performed at a same storage device;
combining the two separate commands into a single command in the data queue in order to reduce an overall number of commands in the data queue;
placing the single command at a location in the data queue based on a combination of priority levels for each of the two separate commands;
receiving from a user a time period for a command in the data queue; and
after expiration of the time period, incrementing a priority of the command.

* * * * *